3,473,910
APPARATUS FOR TRANSPORTING GLASS SHEETS
ON A GAS MODULE BED
Dennis Wilde, Hoscar, near Ormskirk, and Harry Ross Scarlett Jack, Ormskirk, England, assignors to Pilkington Brothers Limited, Liverpool, Lancashire, England, a corporation of Great Britain
Filed Oct. 11, 1966, Ser. No. 585,891
Claims priority, application Great Britain, Oct. 22, 1965, 44,899/65
Int. Cl. C03b 18/00
U.S. Cl. 65—182                                9 Claims

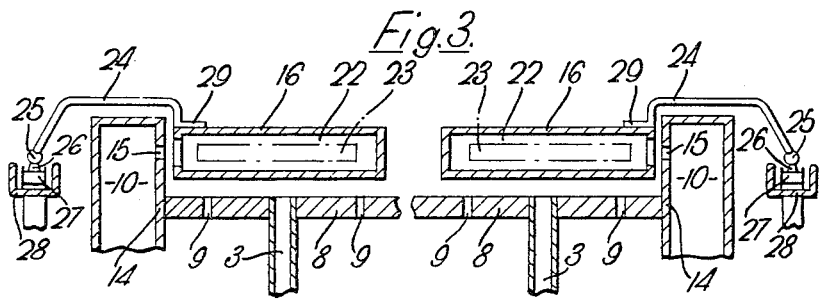
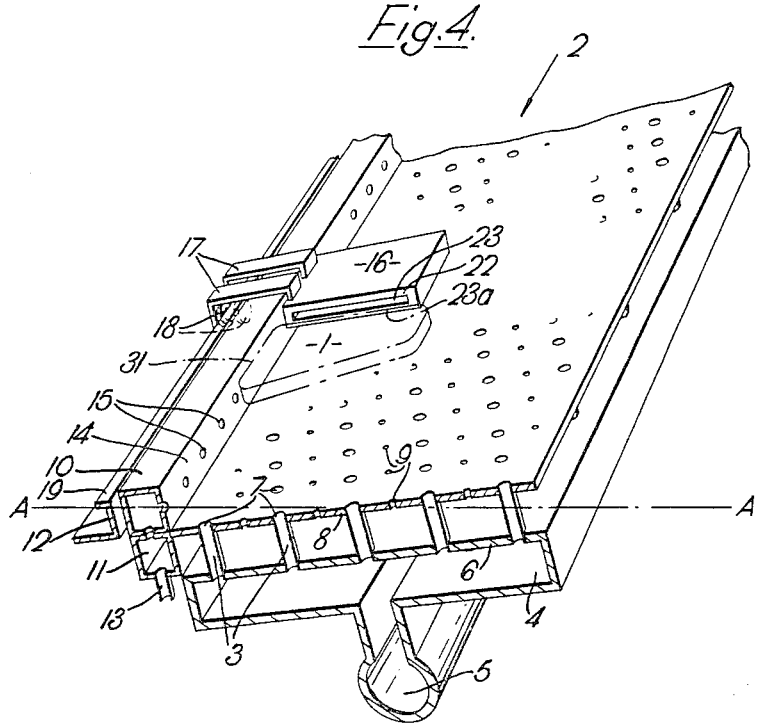

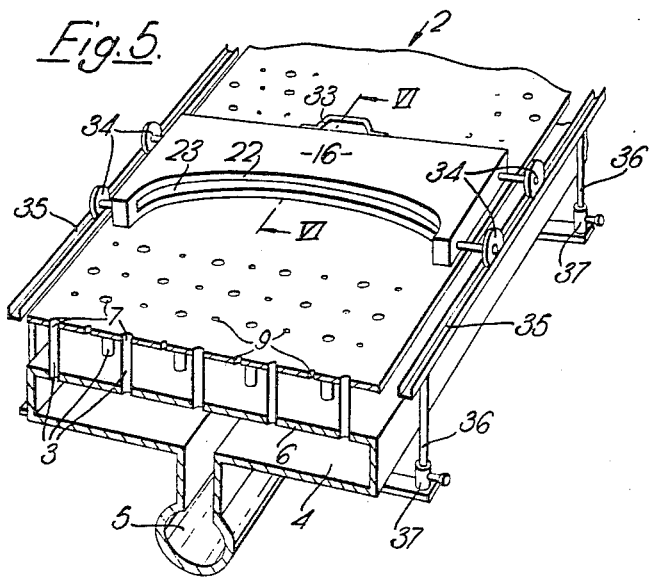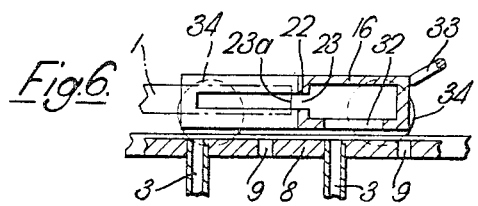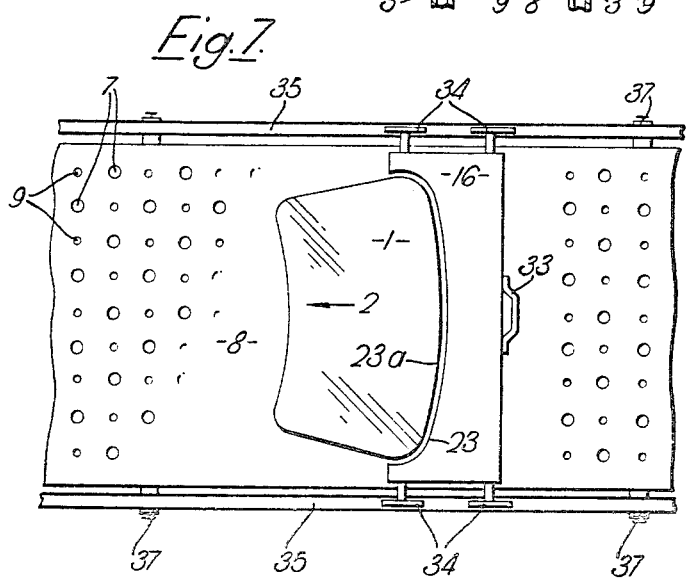

ABSTRACT OF THE DISCLOSURE

A sheet of glass is transported on a gaseous support in an intended path of travel by guided means mounted for movement along the path behind the glass sheet. Guiding means extending parallel to the path of travel of the sheet are provided for guiding the enclosure. In an alternative arrangement, the path of travel is inclined downwardly in the direction of travel and the enclosure is mounted for movement along the path in front of the glass sheet to control the advance of the glass sheet.

---

Figure 1:
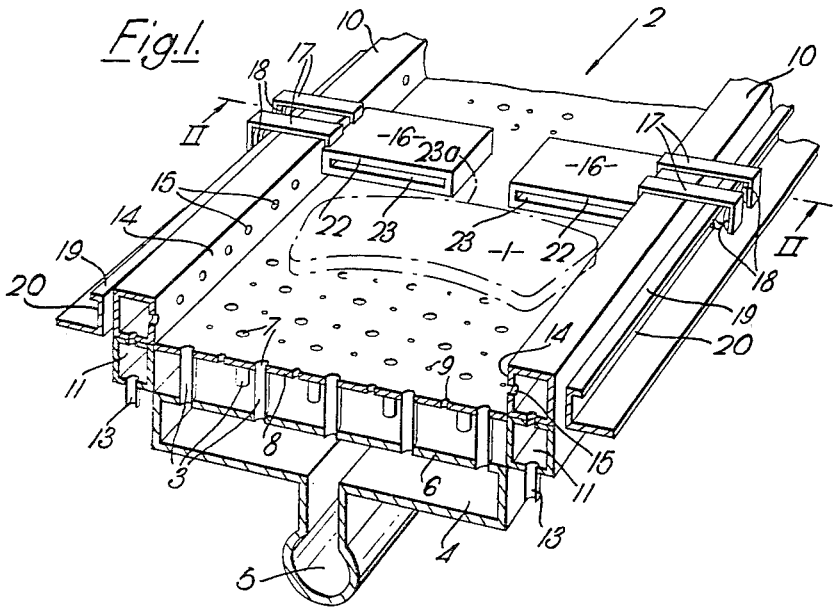

This invention relates to apparatus for transporting sheets of glass on a gaseous support.

The main object of the present invention is to totally avoid contact of the glass sheets with any solid means whilst transporting the glass on a gaseous support in its intended path of travel so that even though a glass sheet on the gaseous support may be in a plastic state at least during some part of its travel, it will not suffer deformation by the forces applied to transport the sheet.

Apparatus according to the present invention for transporting a sheet of glass on a gaseous support in an intended path of travel is characterised by a guided enclosure capable of collecting gas and releasing a gaseous flow which exerts on the glass sheet a force influencing the motion of the sheet in that path, and guiding means for said enclosure constraining movement of the enclosure to the intended direction of travel of the glass sheet.

Apparatus according to the present invention may be used to transport a sheet of glass upon which a motive force is imposed by gravity, as hereinafter more fully described, or may be used to apply a driving force to advance the sheet.

From the latter aspect, the present invention provides apparatus for advancing a sheet of glass on a gaseous support in an intended path of travel, characterised by a guided enclosure capable of collecting gas and releasing gas as a gaseous flow directed at the trailing edge of the supported sheet, which issuing gaseous flow exerts a driving force on the glass sheet, and guiding means for said enclosure constraining movement of the enclosure to the intended direction of travel of the glass sheet.

The gaseous flow directed at the trailing edge of the glass may extend along the whole length of the trailing edge and will be streams of equal length. The gaseous flow may alternatively be complemental streams spaced apart and near to the edges of the glass confluent with the trailing edge and such streams may have a width to engage the respective confluent edges and develop an inwardly directed force thereby advancing the glass and constraining the glass to move in the intended path of travel.

Preferably, in apparatus according to the present invention, the enclosure has a bottom and the issuing streams are derived by collecting gases in the enclosure from a source independent of the gaseous support and releasing the gases at the front of the enclosure so that the issuing streams have a regulatable intensity independent of the pressure applied to the gaseous support.

One preferred apparatus constructed according to the present invention comprises two enclosures located at opposite sides of the path of travel of the sheet, and operatively associated with the guiding means so as to direct the respective gaseous flows at the trailing edge of a sheet of glass.

The two enclosures may be movable independently so that one sheet of glass can be advanced independently in front of each of the two enclosures or alternatively, the two enclosures may be maintained in predetermined relation with each other so as to direct their respective gaseous flows at the outer parts of the trailing edge of a single sheet of glass.

Preferably, where two opposed chambers are employed, apparatus according to the present invention comprises two parallel gas conduits spaced apart by a distance greater than the width of the sheets and extending parallelly to the intended path of travel of the sheets, each of the gas conduits having an apertured wall, and the two enclosures being in the form of chambers having a bottom wall, the chambers projecting inwardly from the respective gas conduits and being mounted for movement along the gas conduits, each chamber having an apertured wall in juxtaposition with and matching said apertured wall of the respective gas conduit.

Advantageously, in apparatus according to the present invention, each chamber is mounted to allow independent inclination of the chamber about a respective horizontal axis during motion of the chamber, so that the chamber can independently follow any variations in the inclination of the margin of a transversely curved bed from which the gaseous support is derived. Thus the apparatus may be used to advance a sheet of glass along a bed, the profile of which progressively alters from an initially flat shape to a curved shape corresponding to the curvature to be imposed on a sheet advanced along the bed, and the chamber or chambers will be able to follow the inclination of the margin of the curved bed so that the chamber will at all times lie in the same plane as the preceding portion of the edge of the glass sheet.

Where a flat bed is used along the whole of the path of travel, the two chambers may be rigidly joined together in spaced relation by a bracing element.

The gaseous support on which the sheet of glass is to be advanced by apparatus according to the present invention is preferably derived from a bed, through which bed gas is supplied for said gaseous support.

Preferably in apparatus constructed according to the present invention the construction employed to constitute the gaseous support in the apparatus comprises in combination a substantially continuous bed arranged in the direction of the path and having gas outlets for delivering gas, a header for maintaining a common plenum body of gas and for supplying gas at a common pressure to said gas outlets so that gas is delivered through the said gas outlets along the said path at a pressure sufficient to form and maintain a gas film for supporting the glass above the bed, said bed also having exhaust outlets at intervals spaced over the whole area of the bed to permit the release of gas from the gas film beneath the glass and thereby provide a continuous support from the film for the glass as it is advanced along the path of travel.

Another preferred form of apparatus constructed according to the present invention includes a bed which is inclined transversely to the direction of travel of the sheet, a guided enclosure mounted for movement over the lower side of the bed, and means for directing at the lower edge of the sheet a gaseous flow to balance the transverse force of gravity acting on the sheet.

The gases collected in the guided enclosure are preferably supplied from a gas conduit extending along the lower side of the bed parallelly to the intended path of travel of the sheet and having an apertured wall, the guided enclosure being in the form of a chamber having a bottom and being mounted for movement along the gas conduit, and the chamber having an apertured wall in juxtaposition with and matching said apertured wall of the gas conduit.

Whether one enclosure or two enclosures are employed, each enclosure may be held in contact with the respective gas conduit, when a conduit is provided, or may in any case be hingedly supported to be free to float on the gaseous support.

A further embodiment of the present invention comprises a guided enclosure having a width greater than the width of the glass sheet to be advanced on the gaseous support.

The guiding means may then be grooves in the upper surface of a flat bed, rails mounted on the bed, or may be side walls of the bed, and the enclosure will be provided with suitable runners to engage with the guide means, e.g., wing-like runners, engaging over side walls of the bed.

Such a guided enclosure is preferably provided with wheels adapted to engage with parallel guides spaced apart by a distance greater than the width of the glass sheet.

Preferably the guides are channels, and means are provided for adjusting the channels in a vertical direction so as to adjust the level of the guided enclosure.

Where an enclosure having a width greater than the width of the glass sheet is employed the enclosure may be bottomless to collect part of the mingling streams forming the gaseous support and releases the collected gases at the front of the enclosure.

The enclosure may comprise a top, and back and side walls, the front of the enclosure being open, or the enclosure may have an apertured front wall having a configuration corresponding to the profile of at least part of the trailing edge of the glass sheet, through which wall passes the issuing gaseous flow.

The front wall may have a slot at the level of the floating glass sheet or a series of apertures at the level of the floating glass sheet.

In apparatus according to the present invention, in which the gas is supplied for said gaseous support through a bed, the bed may be tilted to allow the force of gravity to exert, on a sheet of glass supported on the gaseous support, a controlling force opposing the force exerted by the driving gases.

Figure 2:
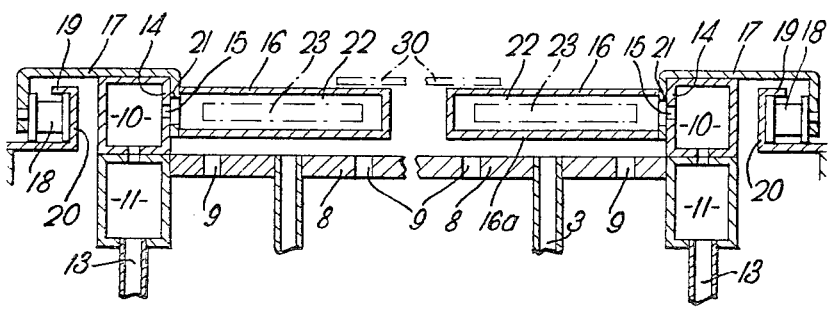

In order that the invention may be more clearly understood, some embodiments thereof will now be described, by way of example, with reference to the accompanying diagrammatic drawings, in which:

FIGURE 1 shows a perspective view of one preferred apparatus for advancing a sheet of glass in accordance with the present invention, in which two enclosures in the form of chambers are supplied with gas from parallel gas conduits, the apparatus including a bed structure from which the gaseous support for the sheet is derived, FIGURE 2 shows a section on the line II—II through the apparatus shown in FIGURE 1, FIGURE 3 shows a section through a modified form of the apparatus shown in FIGURES 1 and 2, in which the chambers are hingedly mounted, FIGURE 4 shows a perspective view of another embodiment of the invention, in which a flat bed from which the gaseous support is derived is inclined transversely of the path of travel of the sheet, FIGURE 5 shows a further embodiment of the invention, in which the guided enclosure is a bottomless enclosure, FIGURE 6 shows a local section on the line VI—VI in FIGURE 5, and FIGURE 7 shows a plan view of the apparatus shown in FIGURE 5.

In the drawings, like reference numerals designate the same or similar parts.

Referring to FIGURE 1 of the drawings, there is indicated at 1 a glass sheet, of a shape suitable for a vehicle windscreen, disposed in face downward position, supported on a continuous gaseous film created under the sheet by delivering gas at regular intervals, along the intended path of travel 2 of the glass sheet 1, through gas tubes 3 at a pressure sufficient to provide support in the film for the glass sheet 1.

A header 4 is continually supplied with gas by a gas supply line 5 and the tubes 3 are located with their lower ends in the roof 6 of the header 4. The upper ends of the tubes 3 are located in apertures 7 in a plate 8. The gas supplied to the header 4 from the gas supply line 5 forms in the header 4 a common plenum body of gas which is supplied to each of the tubes 3 so that gas passes through the tubes 3 and emanates as gas streams through apertures 7 in the plate 8 which constitutes a flat bed over which the gaseous film is formed under the glass sheet, wherever the sheet may be.

The plate 8, constituting the bed over which the gaseous film is formed, has another series of apertures 9 at alternating intervals with the apertures 7 and these apertures 9 communicate directly through the plate 8 to the space between the plate 8 and the roof 6 of the header 4. The apertures 9 act as exhaust apertures through which gas from the gaseous film passes to ensure that there is no substantial build-up of pressure beneath the glass sheet and a substantially uniform support for the glass sheet 1 from the gaseous film is ensured.

The gas which is extracted from the gaseous film by passage through exhaust apertures 9 to the space between the plate 8 and the roof 6 of the header 4 is therefore able to disperse in all directions between the tubes 3 extending between the plate 8 and the upper surface 6 of the header 4.

Referring to FIGURES 1 and 2, the bed 8 has parallel side walls formed by two parallel gas conduits 10. The gas conduits 10 communicate throughout their whole length with respective plenum chambers 11 through ports 12. The plenum chambers 11 are supplied with gas through tubes 13. The gas conduits 10 are spaced apart by a distance greater than the width of the glass sheet 1 and extend parallelly to the intended path of travel of the sheet 1, which path lies between the conduits 10. The opposed walls 14 of the conduits 10 are formed with apertures 15.

Two enclosures in the form of chambers 16 having a bottom wall 16a are mounted in opposition on the conduits 10, the chambers 16 projecting inwardly from the conduits 10. Each chamber 16 is supported by two wing-like runners 17 which pass over the top of the adjacent conduit 10 and are movably retained at their outer ends by wheels 18 mounted on the runners 17, the wheels engaging under flanges 19 on rails 20, so that the chambers 16 are operatively associated with guiding means constituted by the conduits 10 and rails 20. The weight of the chambers 16 is such that the pressure of the gaseous support under the chambers 16, does not cause the chambers 16 to be displaced upwardly, and if required, the inner ends of the chambers 16 may be weighted to achieve this.

Each of the chambers 16 has an apertured wall 21 which is flat and is juxtaposed with the inward facing wall 14 of the respective conduit 10 with the apertures of the wall 21 in register with the apertures 15 in the wall 14 of the conduit 10. The front wall 22 of each chamber 16 is formed with a horizontal slot 23 at the level of the supported sheet 1.

The conduits 10 may have a cross-sectional shape other than rectangular, for example they may be cylindrical, and the apertured wall 21 of each chamber 16 will be of matching shape.

The opposed chambers 16 can be moved along the path of travel of the sheet 1 in unison, e.g., by means of handles or synchronised driving means, as indicated in FIGURE 3 and hereinafter described, and throughout their movement the chambers 16 continually collect gas from the gas conduits 10 through the juxtaposed apertures in the inward facing walls 14 of the conduits 10 and the apertured walls 21 of the chambers 16. The collected gas is continually released as gaseous flows issuing from the slot 23 in the front wall 22 of each chamber 16 and directed at the trailing edge 23a of the sheet, to exert a driving force on the sheet.

On moving the chambers 16 forward in unison, the chambers are constrained to the intended path of travel of the sheet by the guiding means constituted by the conduits 10 and rails 20, and the sheet of glass 1 in front of the chambers 16 is driven along its intended path of travel.

The apparatus shown in section in FIGURE 3 of the drawings has many features in common with the apparatus of FIGURES 1 and 2. However, in FIGURE 3 the two chambers 16 are not held in contact with the conduits 10 but are hingedly supported so as to be allowed to float on the gaseous support above the bed.

Each of the chambers 16 is located by means of front and rear arms 24 of which only the front arms can be seen in the sectional view of FIGURE 3. One end of each of the arms 24 is pivotally attached at 25 to a vertical mounting 26 projecting upwardly from a driven roller link chain 27 running in a channel 28 supported as hereinafter described with respect to FIGURE 5. The other end of each arm 24 is attached at 29 to the chamber 16, so that the arms 24 are substantially horizontal and any slight vertical movement of the chamber 16 if the gas support pressure should vary, will not produce a significant transverse movement of the chamber.

The two chains 27 on opposite sides of the bed 8 are driven by any suitable means, such as an electric motor or motors, in synchronism, so that the two chambers 16 can be moved in unison along the bed 8.

It will be appreciated that the linkage including pivot 25 as shown in FIGURE 3 allows each chamber 16 to float at its natural level on the gaseous support above the bed 8, and at the same time, because there are front and rear arms 24, each chamber 16 is maintained at right angles to the respective driven chain 27.

Guiding means constituted by a driven chain located along the side of the bed 8, and a linkage from the chain to the guided enclosure, as exemplified in FIGURE 3 of the drawings, may be used with any guided enclosure in apparatus according to the present invention, for example, with a bottomless enclosure or a single enclosure at the lower side of an inclined bed, as hereinafter described.

In FIGURE 3, however, the enclosures are in the form of chambers 16 which have bottoms, and the air supply to the chambers enters the chambers through apertured walls 21 of the chambers 16.

In the apparatus shown in FIGURES 1 to 3, the gas supply to the guided chambers 16 is independent of the supply to the gaseous support through the bed 8. Accordingly, the intensity of the driving flows of gas issuing from the chambers 16 can be adjusted to a predetermined value by adjusting the supply pressure to the conduits 10, as required, without affecting the supply to the gaseous support. Normally the pressure of gas in the conduits 10 is greater than the pressure of the gas supplied to the gaseous support.

The apparatus shown in FIGURES 1 to 3 may be used to advance cold sheets of glass in any desired path of travel, and may also be used to advance sheets of glass through sheeting and cooling stages, for example, the stages of a tempering process, and the temperature of the gas supplied for the gaseous support and for the driving flows may be controlled to influence the temperature of the glass sheet.

It may be desired to advance a sheet of glass heated to a plastic condition along a bed, the transverse profile of which bed progressively changes along the path of the sheet from a flat shape to a curved shape corresponding to a curvature to be imposed on the sheet of glass. It will be appreciated that if the apertured walls of the conduits 10 are along their whole lengths at right angles to the margins of such a profiled bed, the mounting of the chambers 16 as shown in FIGURES 1 and 2 or FIGURE 3 will allow the chambers to independently follow the changing inclinations of the margins of the bed traversed by chambers 16.

If, however, the apparatus is not to be used with a profiled bed, the chambers 16 may be rigidly joined together in spaced relation by a bracing element as indicated in broken lines at 30 in FIGURE 2.

FIGURE 4 of the accompanying drawings shows another apparatus for continually advancing glass sheets in accordance with the invention, in which the bed is inclined transversely to the direction of travel 2 of the sheet 1, as is indicated by the line A—A which lies in a horizontal plane.

A single guided enclosure 16 is mounted at the lower side of the bed 8, in the same way as in FIGURES 1 and 2, for movement over the lower side of the bed. The enclosure 16 is supplied with gas from a gas conduit 10 extending along the lower side of the bed parallelly to the intended path of travel 2 of the sheet 1, the supply of gas from the conduit 10 to the chamber 16 being achieved in the same way as the supply to the chambers 16 in FIGURES 1 and 2.

The apparatus shown in FIGURE 4 is particularly suitable for transporting sheets of glass having one straight edge, such as the sheet 1 shown in FIGURE 4 which is of a shape suitable for a vehicle side light. The straight edge 31 of the sheet lies parallel with and adjacent the apertured wall 14 of the gas conduit 10, and the gas streams issuing from the apertures 15 in the wall 14 constitute a gaseous flow directed at the lower edge of the sheet 1 to balance the transverse force of gravity acting on the sheet, thereby keeping the edge 31 out of contact with conduit 10.

The gaseous flow directed from the horizontal slot 23 in the front wall 22 of the chamber 16 at the trailing edge 23a of the sheet 1 exerts a driving force on the sheet, and by advancing the chamber 16 along the guide means constituted by the conduit 10 and rail 20 the sheet 1 is constrained to move in the intended path of travel without making contact with any solid means.

It will be appreciated that, instead of the chamber shown in FIGURE 4, a hingedly mounted chamber as shown in FIGURE 3 may be used in the apparatus as shown in FIGURE 4, to provide the gaseous driving force.

The apparatus shown in FIGURES 5 to 7 includes a bed structure the same as that shown in FIGURE 1.

In FIGURES 5 to 7 the enclosure 16 has a width greater than the width of the glass sheet and has an apertured front wall 22, the configuration of which wall corresponds to the configuration of the trailing edge 23a of the sheet 1. The aperture in the wall 22 has the form of a slot 23 at the level of the glass sheet 1 floating on the gaseous support, which slot 23 extends substantially across the whole length of the wall 22, and is of a length to extend along the whole length of the trailing edge 23a and partially along the edges of the sheet confluent with the trailing edge 23a.

Referring particularly to FIGURE 6 of the accompanying drawings, it will be seen that the enclosure 16 shown therein is a bottomless enclosure, that is to say, an opening 32 extends substantially over the whole of the bottom area of the enclosure, so that in operation the enclosure 16 collects part of the mingling streams forming the gaseous support, and the collected gas is released through the slot 23 in the front wall 22 of the enclosure 16 as a gaseous flow issuing on to the trailing edge 23a of the sheet 1, and also engaging the edges confluent with the trailing edge.

The enclosure 16 is provided with a handle 33 which can be engaged by the end of an appropriately adapted rod manipulated from a remote position, if required, so that the enclosure 16 can be moved on wheels 34 engaging with guiding means constituted by channels 35 spaced apart by a distance greater than the width of the sheet 1. The channels 35 are supported on posts 36 held in adjustable tubular clamps 37 so that the channels 35 can be adjusted in a vertical direction so as to adjust the level of the guided enclosure 16 relative to the bed.

The movement of the enclosure 16 is constrained by the guiding means, so that the moving enclosure must follow the intended path of travel of the sheets, and the gaseous flow directed at the trailing edge 23a causes the sheet 1 to advance before the enclosure 16 while the gaseous flows directed on the edges confluent with the edge 23a develop inwardly directed forces constraining the sheet 1 to move in the intended path of travel.

Accordingly, the glass sheet 1 supported on the gaseous support in front of the enclosure 16 is chased along its intended path of travel by the gaseous flow issuing from the slot 23 when the enclosure 16 is moved forward under the constraint of the channels 35.

The guided enclosure 16 in the apparatus shown in FIGURES 1 to 4 are in the form of chambers which have bottoms and are supplied with gas from gas conduits 10 forming walls to the bed, but the enclosures may alternatively be bottomless enclosures which collect gas emerging from the bed 8 and release the gas as a driving flow in the manner of the enclosure 16 shown in FIGURES 5 to 7 and hereinbefore described.

The bed may be provided with a row of supply apertures separate from the supply and release apertures for the gaseous support, and which lie to one side of the intended path of travel of the glass sheet, the row of apertures being supplied with gas either from the header 4 or from a separate source, and each enclosure will then extend over the row of supply apertures and will either have a bottom which is apertured in register with the row of supply apertures, or will be a bottomless enclosure so that gas from the row of supply apertures will be collected in the enclosure.

When glass sheets are to be advanced over a flat bed by apparatus according to the present invention at a closely controlled speed, it is preferable for the bed to be longitudinally tilted against the direction of movement of the sheets to allow the force of gravity to exert on the sheets a controlling force opposing the force exerted by the driving gases, so that each sheet is prevented from running ahead of the enclosure or enclosures directing the driving gases. A tilt of less than ½° is sufficient for this purpose. However, when the speed of the sheets is unimportant, such a longitudinally tilted bed is not necessary.

Apparatus according to the invention including a longitudinally tilted bed, as just referred to, may also be operated in reverse, that is to say, the guided enclosure or enclosures are moved down the incline of the bed and thus instead of the glass sheet being advanced by the gaseous streams, the glass sheet follows the enclosure or enclosures under the influence of gravity. The gaseous flow from the enclosure or enclosures influences the motion of the sheet in the intended path of travel by exerting on the glass sheet a force opposing and balancing the force of gravity on the sheet, and thereby the sheet is transported along the bed at a rate corresponding to the rate of movement of the enclosure or enclosures.

It will be appreciated that by using apparatus as described herein, glass sheets may be transported on a gaseous support along an intended path of travel without any contact between the glass sheets and solid means, and accordingly even though a glass sheet may be in a plastic state, at least during part of its travel, it will not be deformed by the force applied to transport the sheet.

We claim:

1. Apparatus for transporting a sheet of glass on a gaseous support in an intended path of travel, characterised by a guided enclosure mounted for movement along said path behind the glass sheet and having means capable of collecting gas from a supply source and releasing a gaseous flow in a direction which exerts on the trailing edge of said glass sheet a force effecting advancement of said sheet along said path, and guiding means for said enclosure constraining movement of the enclosure to the intended direction of travel of the glass sheet, said guiding means comprising at least one guide extending parallel to said path and means in the enclosure for engagement with said guide.

2. Apparatus according to claim 1, in which the enclosure has a bottom and the gaseous flow is derived by collecting gases in the enclosure from a source independent of the gaseous support and releasing the gases at the front of the enclosure so that the issuing streams have a regulatable intensity independent of the pressure applied to the gaseous support.

3. Apparatus according to claim 1, in which the enclosure is hingedly supported to be free to float on the gaseous support.

4. Apparatus according to claim 1 in which the guided enclosure is formed with gas releasing and glass advancing means extending laterally into proximity with the lateral edges of said gaseous support.

5. Apparatus according to claim 4, in which the guides are channels, and means are provided for adjusting the channels in a vertical direction so as to adjust the level of the guided enclosure.

6. Apparatus according to claim 1 in which there are two said guided enclosures located at opposite sides of the path of travel of the sheet, each enclosure having its separate guiding means constraining movement of the enclosure to the intended direction of travel of the glass sheet and comprising, on the adjacent side of said path, a guide extending parallel to said path and means on the enclosure for engagement with said guide.

7. Apparatus according to claim 6, comprising two parallel gas conduits spaced apart by a distance greater than the width of the sheets and extending parallel to the intended path of travel of the sheets, each of the gas conduits having an apertured wall, and two enclosures in the form of chambers having a bottom wall, the chambers projecting inwardly from the respective gas conduits and being mounted for movement along the gas conduits, each chamber having an apertured wall in juxtaposition with and matching said apertured wall of the respective gas conduit.

8. Apparatus according to claim 7, in which each chamber is mounted to allow independent inclination of the chamber about a respective horizontal axis during motion of the chamber, so that the chamber can independently follow any variations in the inclination of the margin of a transversely curved bed from which the gaseous support is derived.

9. Apparatus for transporting a sheet of glass on a gaseous support in an intended path of travel, which support is inclined to the horizontal in a downward direction with respect to the direction of movement of the sheet along the path, characterised by a guided enclosure mounted for movement along said path in front of the glass sheet and capable of collecting gas and releasing a gaseous flow which exerts on the leading edge of said glass sheet a force controlling the advance of said sheet along said path, and guiding means for said enclosure constraining movement of the enclosure to the intended direction of travel of the glass sheet which guiding means comprising at least one guide extending parallel to said path and means on the enclosure for engagement with said guide.

References Cited

UNITED STATES PATENTS

| | | | |
|---|---|---|---|
| 3,223,501 | 12/1965 | Fredley et al. | 65—25 |
| 3,395,943 | 8/1968 | Wilde et al. | 302—31 |

S. LEON BASHORE, Primary Examiner

A. D. KELLOGG, Assistant Examiner

U.S. Cl. X.R.

65—25, 119; 214—1; 302—29, 31